US007289160B2

(12) United States Patent
Takase

(10) Patent No.: US 7,289,160 B2
(45) Date of Patent: Oct. 30, 2007

(54) OUTPUT SELECTION DEVICE AND OUTPUT SELECTION METHOD FOR VIDEO SIGNALS

(75) Inventor: Yutaka Takase, Yokohama (JP)

(73) Assignee: D & M Holdings Inc., Kanagawa (JP)

( * ) Notice: Subject to any disclaimer, the term of this patent is extended or adjusted under 35 U.S.C. 154(b) by 553 days.

(21) Appl. No.: 10/953,101

(22) Filed: Sep. 29, 2004

(65) Prior Publication Data

US 2005/0206789 A1 Sep. 22, 2005

(30) Foreign Application Priority Data

Mar. 17, 2004 (JP) ............................ 2004-075582
Jul. 23, 2004 (JP) ............................ 2004-215071

(51) Int. Cl.
*H04N 5/57* (2006.01)
*H04N 5/58* (2006.01)
*G09G 5/00* (2006.01)

(52) U.S. Cl. ...................... 348/602; 348/603; 348/739; 345/1.1

(58) Field of Classification Search ................ 348/602, 348/603, 739; 345/1.1
See application file for complete search history.

(56) References Cited

U.S. PATENT DOCUMENTS 5,270,818 A 12/1993 Ottenstein
5,379,083 A 1/1995 Tomita
5,818,613 A * 10/1998 Masterson et al. .......... 358/520
6,727,489 B2 * 4/2004 Yano .......................... 250/221
6,900,844 B2 * 5/2005 Itaki et al. .................. 348/383
7,221,374 B2 * 5/2007 Dixon ........................ 345/591
2005/0206788 A1 * 9/2005 Eves et al. .................. 348/602
2007/0081101 A1 * 4/2007 Diederiks et al. ........... 348/602

FOREIGN PATENT DOCUMENTS

GB 2 389 730 12/2003
JP 8-65661 3/1996

* cited by examiner

*Primary Examiner*—Brian P. Yenke
(74) *Attorney, Agent, or Firm*—Koda & Androlia

(57) ABSTRACT

Video signals that are reproduced or processed are outputted to a first video image display device. An illuminance detection section detects the ambient illuminance during the output of the video signals. In the case that the detected illuminance is equal to or greater than a predetermined threshold, the reproduced or processed video signals are outputted to a second video image display device which provides a display with lower brightness than that for a display provided by the first video image display device.

18 Claims, 12 Drawing Sheets

OUTPUT SELECTION DEVICE AND OUTPUT SELECTION METHOD FOR VIDEO SIGNALS

BACKGROUND OF THE INVENTION

The present invention relates to an output device and an output method for outputting video signals.

In recent years, a so-called home theater which provides enjoyments of movies, concerts and the like at home has become significantly popular. A home theater ordinarily comprises a reproducing (playback) device, a projector and a loudspeaker(s). The reproducing device reproduces (or plays back) video signals and audio signals that are recorded on a recording medium such as a DVD (digital versatile disk), etc. The projector projects and displays the video signals, which are reproduced (played back) by the reproducing device, on a screen, etc. The loudspeaker(s) is (are) installed, for example, around the listener and outputs the audio signals that are reproduced by the reproducing device. A signal processing device such as an AV (audio-visual) amplifier or the like may be disposed between the reproducing device and the projector and/or the loudspeaker(s).

Ordinarily, the projector is used in a darkened room. Accordingly, the brightness of the video display using the projector is low so that the video images can be seen well in such a darkened environment. On the other hand, the brightness of video display devices such as Braun tubes (cathode-ray tubes), liquid crystal displays, plasma displays and the like that are used to display video images of television broadcasts, etc. are high.

When a projector is used and adjustments and/or settings on the reproducing device or signal processing device are performed while viewing the display screen, such operations are performed while making reference to handling instructions (manuals). In such cases that manuals are being referred to, the room is brightened (lighted); however, if the room is brightened, then it becomes difficult to see the low-brightness video image display of the projector, and it would become difficult to make adjustments and/or settings of the devices.

For example, in the case of using typical projectors, even if the brightness is adjusted to the maximum value, it is difficult to see the video image display when the illuminance in the room is sufficient to allow reading of the manuals. More specifically, the illumination that is suitable for use of the projector is 5 lux or less, while the illumination that allows reading of manuals is ordinarily about 500 lux and is at least 300 lux.

Accordingly, in such cases, it is conceivable that adjustments and/or settings are made by outputting the video signals from the reproducing device or signal processing device to another video image display device that enables a higher brightness display, such as a cathode-ray tube, etc.

However, in order to perform adjustments and/or settings of the devices in a brightened room, it is necessary to light up the illumination inside the room and to select a video image display device with high brightness as the video signal output. Conversely, after the adjustments and/or settings of the devices, it is necessary to turn off the illumination and select a projector with low brightness as the output. From the standpoint of users, who wish to enjoy movies, etc. quickly, it is desirable that the amount of work required for adjustments and/or settings be reduced. Accordingly, such requirements can curtail the enjoyment of the user.

SUMMARY OF THE INVENTION

In light of the facts above, the present invention is advantageous in providing a reproducing device, a signal processing device, and an output selection device for such devices and an output selection method, a reproducing method and a signal processing method that are convenient for users.

Furthermore, the present invention is advantageous in providing a selection device, a reproducing device and a signal processing device and further to provide an output selection method, a reproducing method and a signal processing method that make it possible to select an appropriate video image display device in accordance with the illumination of the environment.

The above advantages are accomplished by a unique structure and a set of unique steps of the present invention for a video image display system in which video signals that are inputted, reproduced or processed are outputted to a first video image display device, and ambient illuminance is detected during the output of the video signals; and in the case that the detected ambient illuminance is equal to or greater than a predetermined threshold, then the inputted, reproduced or processed video signals are outputted to a second video image display device which provides a display with higher brightness than that for a display provided by the first video image display device.

BRIEF DESCRIPTION OF THE DRAWINGS

The invention will now be described by way of examples with reference to the accompanying drawings, throughout which like parts are referred to by like references, and in which.

BEST MODE FOR CARRYING OUT THE INVENTION

First Embodiment

Figure 1:
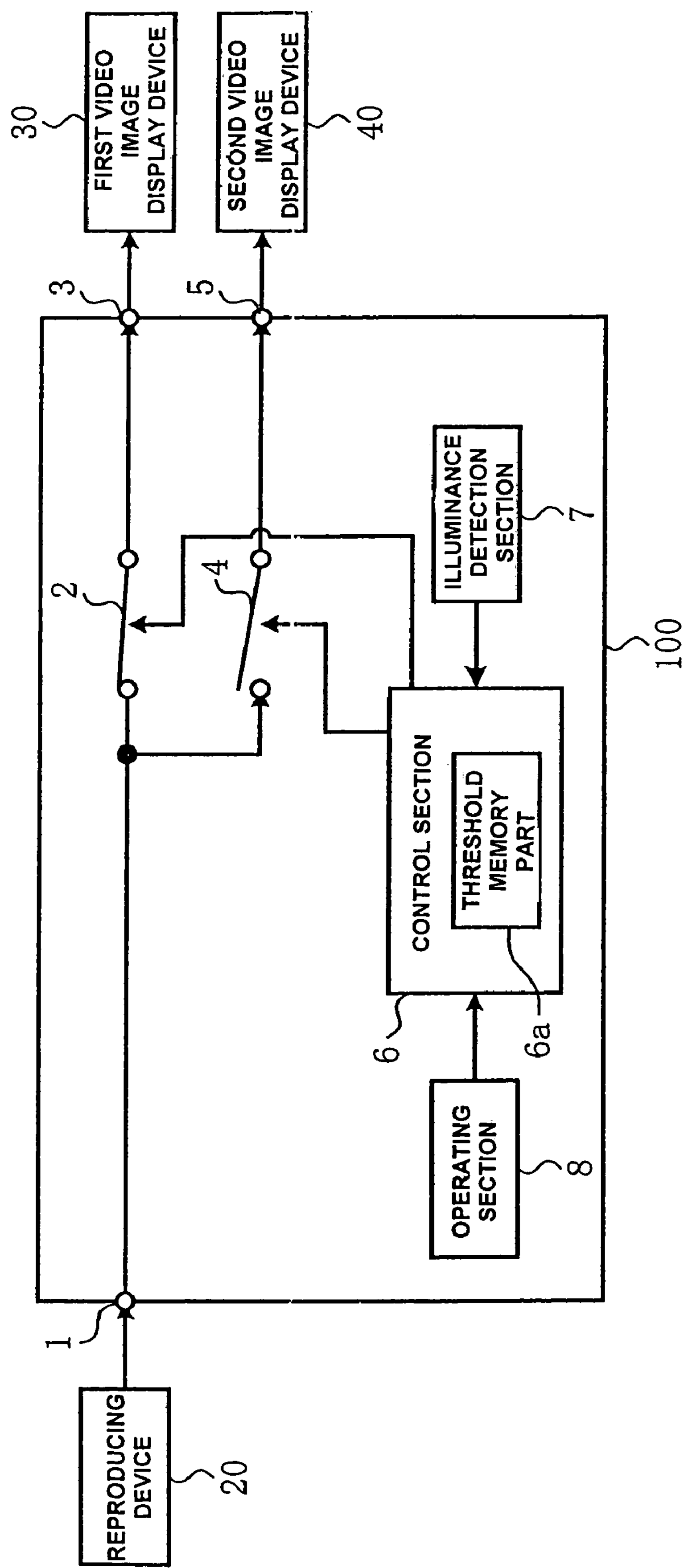
FIG. 1 is a block diagram of the output selection device according to the first embodiment of the present invention.

FIG. 1 is a block diagram of the output selection device 100 for video signals of the first embodiment of the present invention. The output selection device 100 shown in FIG. 1 includes an input terminal 1, output terminals 3 and 5, a control section 6, an illuminance detection section 7, and an operating section 8.

The input terminal 1 is connected to a reproducing (playback) device 20 which reproduces (plays back) video signals recorded on a removable recording medium such as a DVD, etc. or on a fixed recording medium mounted in the reproducing device itself, and this input terminal 1 receives the input of video signals. The input terminal 1 may be connected to a signal processing device such as an amplifier, etc., which executes specified processing of the signals that are reproduced (played back) by the reproducing device 20, and outputs these processed signals. The output selection device 100 is disposed between a reproducing device such as a DVD player, a video recorder, etc. and two video image display devices 30 and 40.

The output terminal 3 is connected to a first video image display device 30 with low brightness, e.g., a projector, and outputs video signals to this display device 30 when the switch 2 is "on".

The output terminal 5 is connected to a second video image display device 40 with high brightness, e.g., a cathode-ray tube TV (television), and outputs video signals to this display device 40 when the switch 4 is "on".

The term "video image display device with low brightness" refers to a device in which the video image display thereof can easily be seen (recognized) at relatively low illuminance, e.g., 5 lux or less, but in which the video image display thereof is difficult to be seen at relatively high illuminance, e.g., approximately 500 lux, or at least 300 lux or greater. The term "video image display device with high brightness" refers to a device in which the video image display thereof can easily be seen even at relatively high illuminance, e.g., approximately 500 lux, or at least 300 lux or greater. The term "low illuminance" refers to such a degree of illuminance in that a person would have difficulty in reading.

The illuminance detection section 7 detects the illuminance (or illumination intensity) in the environment where the output selection device 100 is provided. The illuminance detection section 7 is constructed of a CdS cell, a photodiode, etc. The illuminance detection section 7 transmits an electrical signal that has an attribute corresponding to the illuminance of the light to the control section 6. The illuminance detection section 7 is preferably disposed in the main body of the output selection device 100 in such a manner that its light detection part is movable so as to face different directions. The illuminance detection section 7 may be disposed in a remote location from the main body of the output selection device 100 via wire communication or wireless communication.

Preferably, the illuminance detection section 7 is disposed in the vicinity of the first and/or second video image display devices 30 and 40 that are respectively connected to the output terminal 3 and output terminal 5, and also provided in an orientation allowing the detection of illuminance of the light getting into the display surface. In the case that the orientation of the screen of the first video image display device 30 connected to the output terminal 3 and the orientation of the screen of the second video image display device 40 connected to the output terminal 5 are different, the user may dispose the illuminance detection section 7 with determining the detection direction for the illuminance of the light.

The control section 6 controls the output selection device 100 as a whole. The control section 6 controls the on-off switching of the switches 2 and 4. For example, the control section 6 operates so that the switch 4 is switched "off" when the switch 2 is switched "on"; and when the switch 2 is switched "off", the switch 4 is switched "on". Moreover, it can be designed so that the control section 6 fixes the switch 2 in a constant "on" state and switches the switch 4 "on" and "off" appropriately.

The control section 6 determines the illuminance based upon a signal that is inputted from the illuminance detection section 7 and controls the on-off switching of the switches 2 and 4. The control section 6 includes a threshold memory part 6*a* which stores a threshold of the illuminance detected by the illuminance detection section 7 to switch the switch 2 and switch 4 "on" and "off". Since the illuminance suitable for the use of the projector is generally 5 lux or less, and the illuminance enabling a person to read the manuals is generally at least 300 lux or greater, the threshold of the illuminance is set at, for instance, 100 lux.

The operating section 8 is connected to the control section 6, and it includes operating buttons (not shown) that are used to input the threshold to be stored in the threshold memory part 6*a*. The operating section 8 further includes operating buttons (not shown) that are used to switch the switch 2 and switch 4 "on" and "off" manually. The operating section 8 is in fact optional; and the threshold and the like referred to above can be inputted beforehand by the manufacturer, so that the user has no need to perform operations such as inputting threshold, etc.

The operation of the above-described output selection device 100 of the first embodiment of the present invention will be described below. As long as the substantially same effect can be obtained, the present invention is not limited to the following example.

Figure 2:
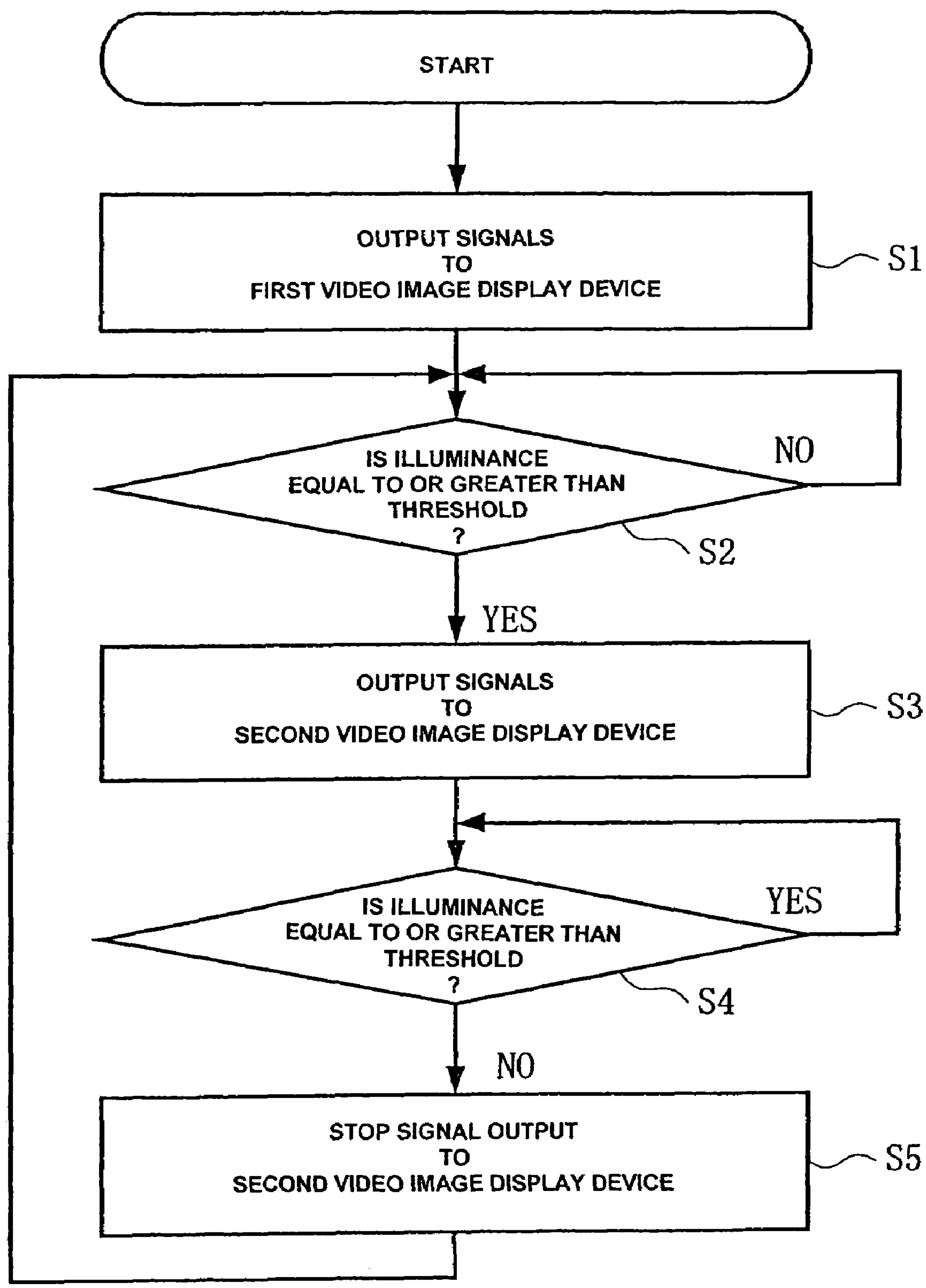
FIG. 2 is a diagram that shows the operational flow of the output selection device of FIG. 1.
Figure 3:
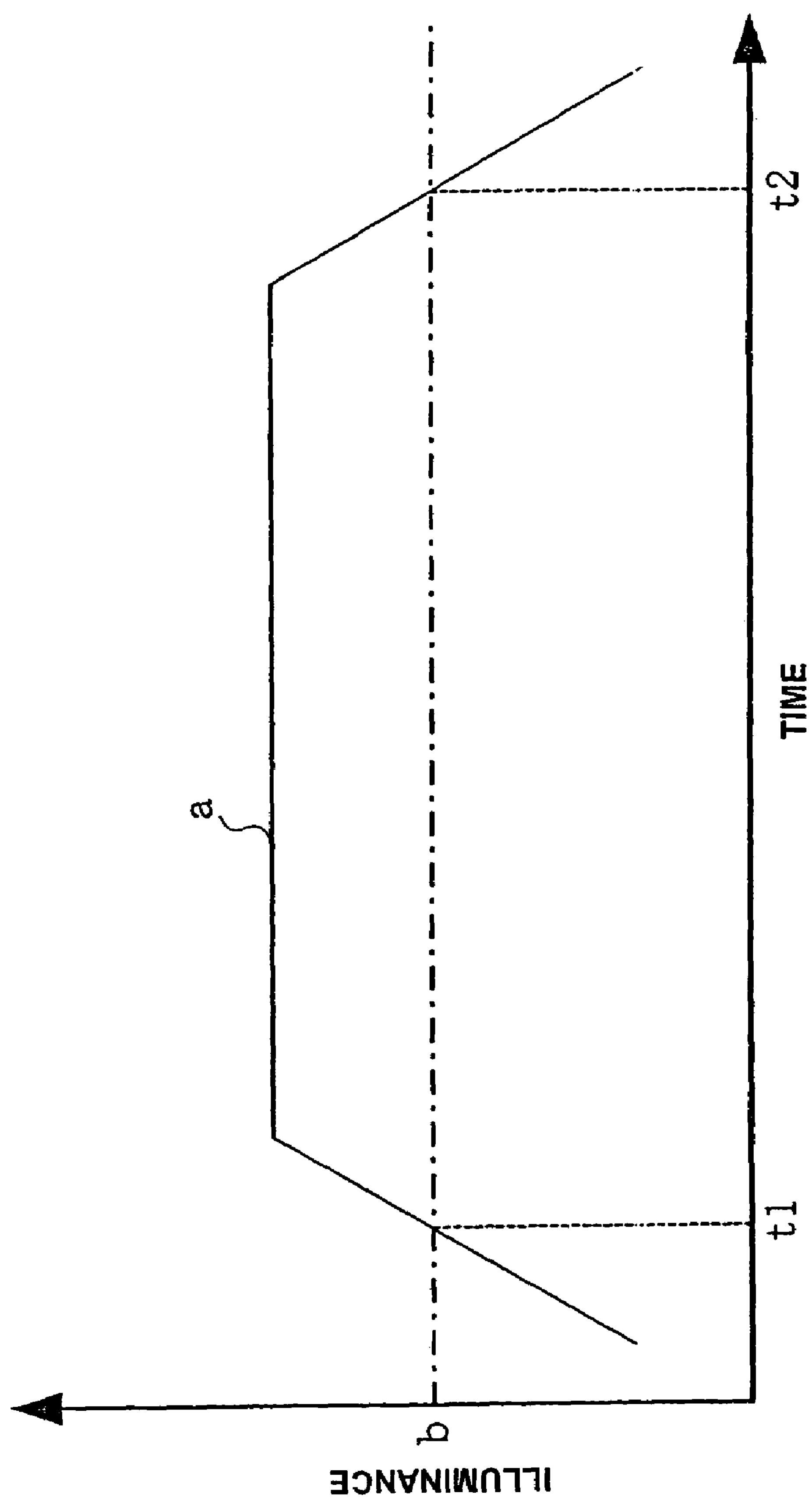
FIG. 3 is a graph that shows the variation in the illumination.

FIG. 2 shows a flow of the operation of the output selection device 100, and FIG. 3 shows an example of the changes in illuminance in a specified environment detected by the illuminance detection section 7. The solid line a in FIG. 3 indicates the illuminance detected by the illuminance detection section 7, and the value b in FIG. 3 indicates the illuminance threshold for the switching the switch 2 and/or switch 4 by the control section 6.

First, the user darkens the room, for example, by turning off the lighting, to use the first video image display device 30 (step S1 in FIG. 2). During reproduction (playback), the control section 6 of the output selection device 100 monitors the changes in illuminance in the use environment by means of the illuminance detection section 7. More specifically, the control section 6 reads out the threshold that is stored in the threshold memory part 6*a* and determines whether or not the detected illuminance is equal to or greater than the threshold (step S2).

If the illuminance is not equal to or greater than the threshold, the control section 6 outputs the video signals only to the first video image display device 30 (step S2: NO).

If the user lights up the room lighting in order to read the manuals, the illuminance detected by the illuminance detection section 7 rises with the passage of time as indicated by the solid line a in FIG. 3. When the illuminance reaches a value that is equal to or greater than the threshold b at time t1 (step S2 in FIG. 2: YES), then the control section 6 switches the switch 4 "on" and outputs the video signals to the second video image display device 40 (step S3). Accordingly, in a state in which the lighting is lit, images are displayed on the second video image display device 40 that is connected to the output terminal 5.

After finishing the reading of the manuals, the user turns off the lighting in the room. In this case, the room gradually grows dark; and from time t2 on in FIG. 3, the illuminance drops below the threshold b (step S4 in FIG. 2: NO). As a result, the control section 6 switches the switch 4 "off" and stops the output of the video signals to the second video image display device 40 (step S5). Accordingly, images are displayed only on the first video image display device 30 that is connected to the output terminal 3.

Thus, in this first embodiment of the present invention, only the second video image display device 40 with high brightness displays images when the illuminance in the environment in which the output selection device 100 is disposed is equal to or greater than the threshold. When the room gets darker so that the ambient illuminance falls below the threshold, the first video image display device 30 with low brightness displays images.

Accordingly, in the case that the first video image display device 30 with low brightness is used, when the room is lightened in order to read the manuals during use, the system is automatically switched to the second video image display device 40 with high (higher) brightness. Consequently, there is no need for the user to switch around the display devices, and the user can read the manuals under the necessary illuminance; and further, the user can make adjustments and/or settings in a convenient manner via an easy-to-see screen that provides high (higher) brightness. If the room is darkened after the adjustments and/or settings have been completed, the system again automatically changes to a display that uses the first video image display device 30 with low (lower) brightness.

In other words, in the case that the room is dark, video signals are not outputted to the second video image display device 40 with high brightness. Accordingly, unnecessary light emission therefrom is prevented, and the video image display of the first video image display device 30 can be seen without any hindrance. In the case that the room is light, then the video signals are outputted to the second video image display device 40 with high brightness, so that a video image on the second video image display device 40 can be seen without any hindrance. Thus, as a result of the use of the output selection device 100 of this first embodiment, the convenience of the reproducing device 20 is improved.

Figure 4:
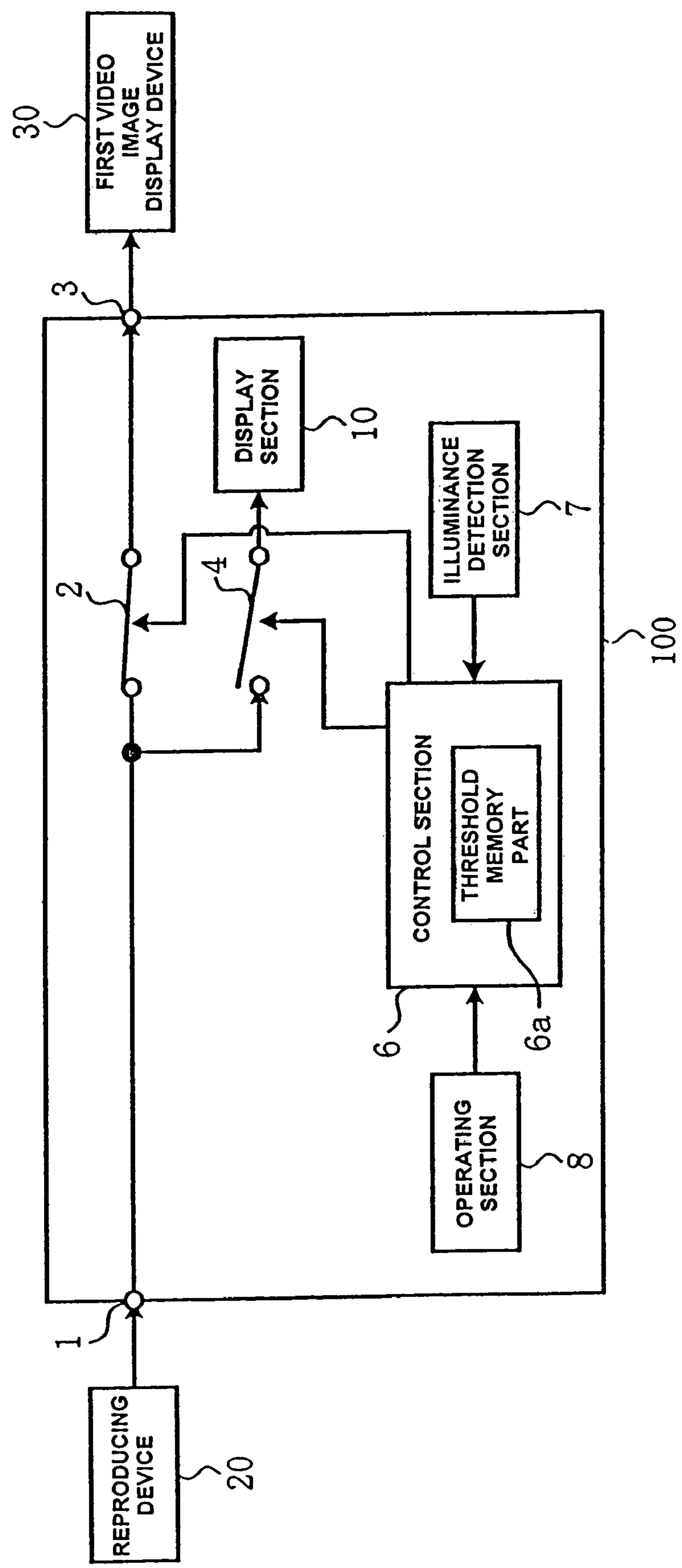
FIG. 4 shows a modification of the output selection device according to the first embodiment of the present invention.

In the above-described first embodiment, the second video image display device 40 with high brightness is provided outside the main body of the output selection device 100. However, as shown in FIG. 4, a display section 10 which has the same function as the second video image display device 40 may be installed inside the output selection device 100 instead of the second video image display device 40 installed outside the output selection device 100. In this case, the display section 10 may be, for instance, a liquid crystal display panel with high brightness, and the user can likewise make adjustments and/or settings on the screen of this liquid crystal display panel. Accordingly, there is no need to install a second video image display device 40 besides the first video image display device 30, and adjustments, etc. can be performed in a simpler manner.

Second Embodiment

Figure 5:
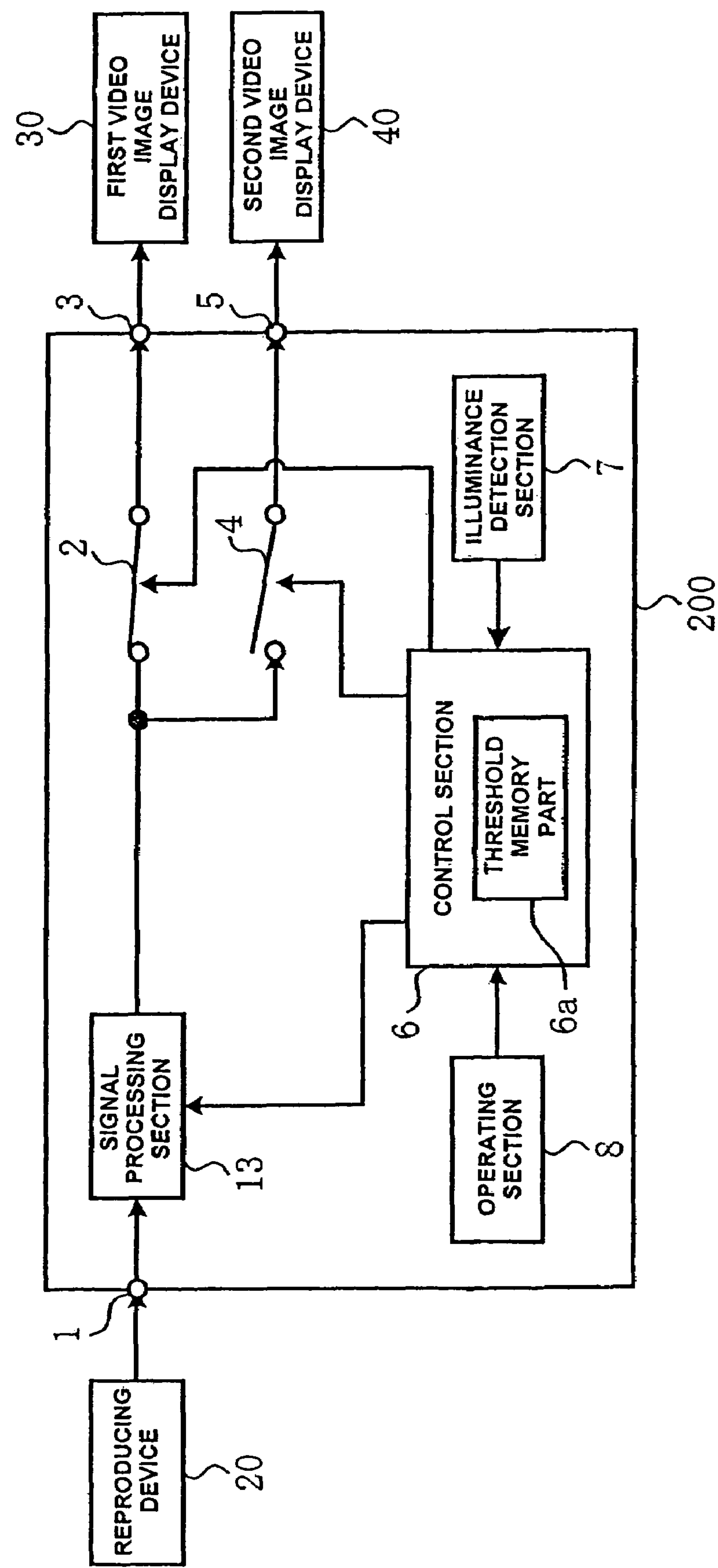
FIG. 5 is a block diagram that shows the signal processing device according to the second embodiment of the present invention.

FIG. 5 is a block diagram of the video signal processing device 200, a second embodiment of the present invention. In order to facilitate understanding, the elements that are the same as those in FIGS. 1 and 4 are labeled with the same reference symbols, and a description of such elements is omitted.

As shown in FIG. 5, the signal processing device 200 of the second embodiment has a construction that is substantially the same as that of the above-described output selection device 100, and the signal processing device 200 further includes a signal processing section 13.

The signal processing section 13, for instance, executes a specified processing on the reproducing (playback) signals from the reproducing device 20 and outputs these signals to the first and second video image display devices 30 and 40 from the output terminals 3 and 5. The signal processing section 13, for instance, amplifies reproducing signals; and in this case, the signal processing device 200 functions as an amplifier.

The signal processing device 200 of the second embodiment functions in a similar manner to the output selection device 100 of the first embodiment. In other words, at an illuminance is less than a predetermined threshold, the signal processing device 200 outputs the processed video signals to only the first video image display device 30 with low (lower) brightness. At an illuminance equal to or greater than the threshold, the signal processing device 200 outputs the processed video signals to only the second video image display device 40 with high (higher) brightness or to both the first and second video image display devices 30 and 40.

As a result, without switching between the display devices, the user can read the manuals under the necessary illuminance; and in addition, the user can make adjustments and/or settings in a convenient manner via an easy-to-see screen that has a high brightness. Moreover, if the room is darkened after adjustments and/or settings have been completed, the system again automatically changes to the first video image display device 30 with low brightness. Thus, in this embodiment of the present invention, the signal processing device 200 is convenient for use.

Figure 6:
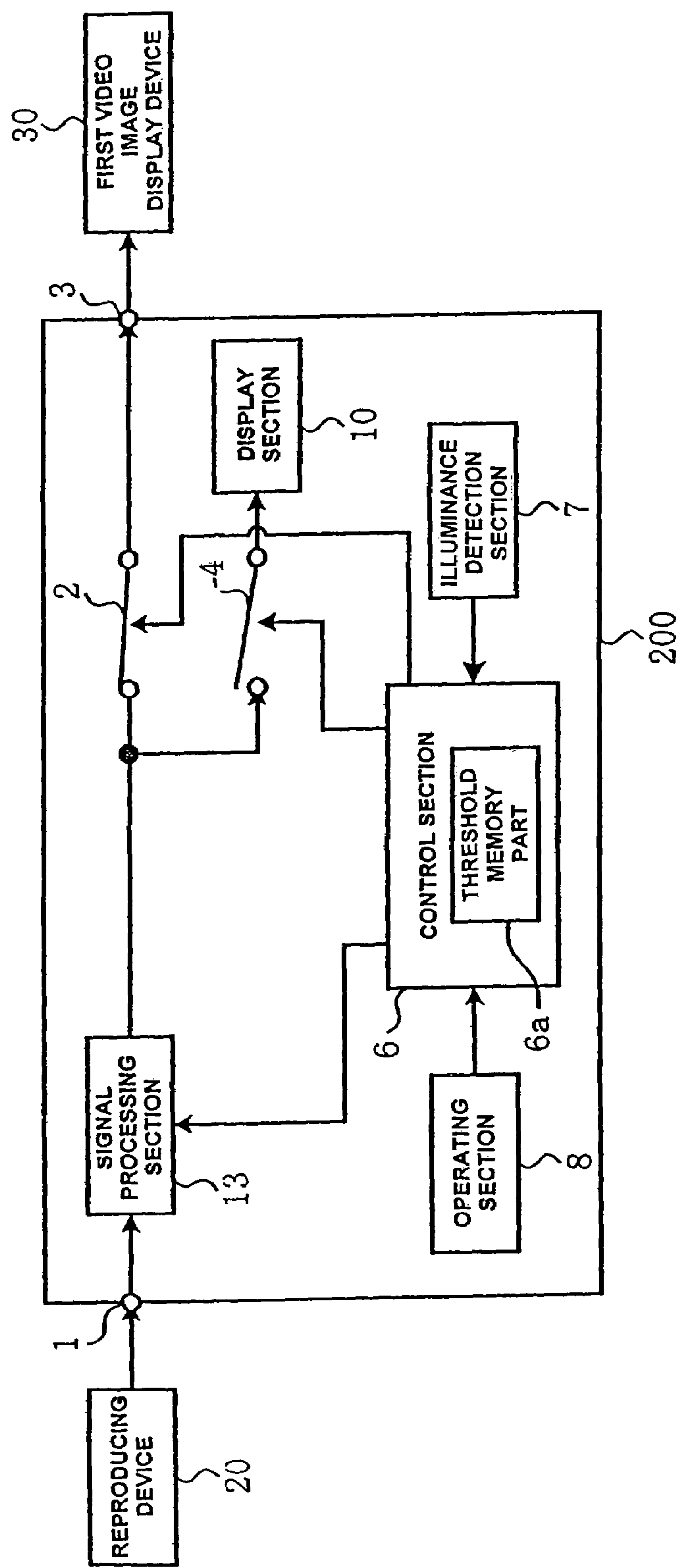
FIG. 6 shows a modification of the signal processing device according to the second embodiment of the present invention.

In the signal processing device 200 of this second embodiment, as in the output selection device 100 shown in FIG. 4, it is also possible to output video signals to a display section 10 such as a liquid crystal display panel, etc., which is installed inside the signal processing device 200 as shown in FIG. 6 instead of the second video image display device 40 provided outside the signal processing device 200.

Furthermore, in the signal processing device 200 of the second embodiment, video signals indicating adjustment items and adjustment values such as the image quality of the images displayed on the video image display devices, etc. as well as setting items and setting values of the signal processing device may be outputted so that such signals are superimposed on the inputted reproducing signals as desired by the user.

Figure 7:
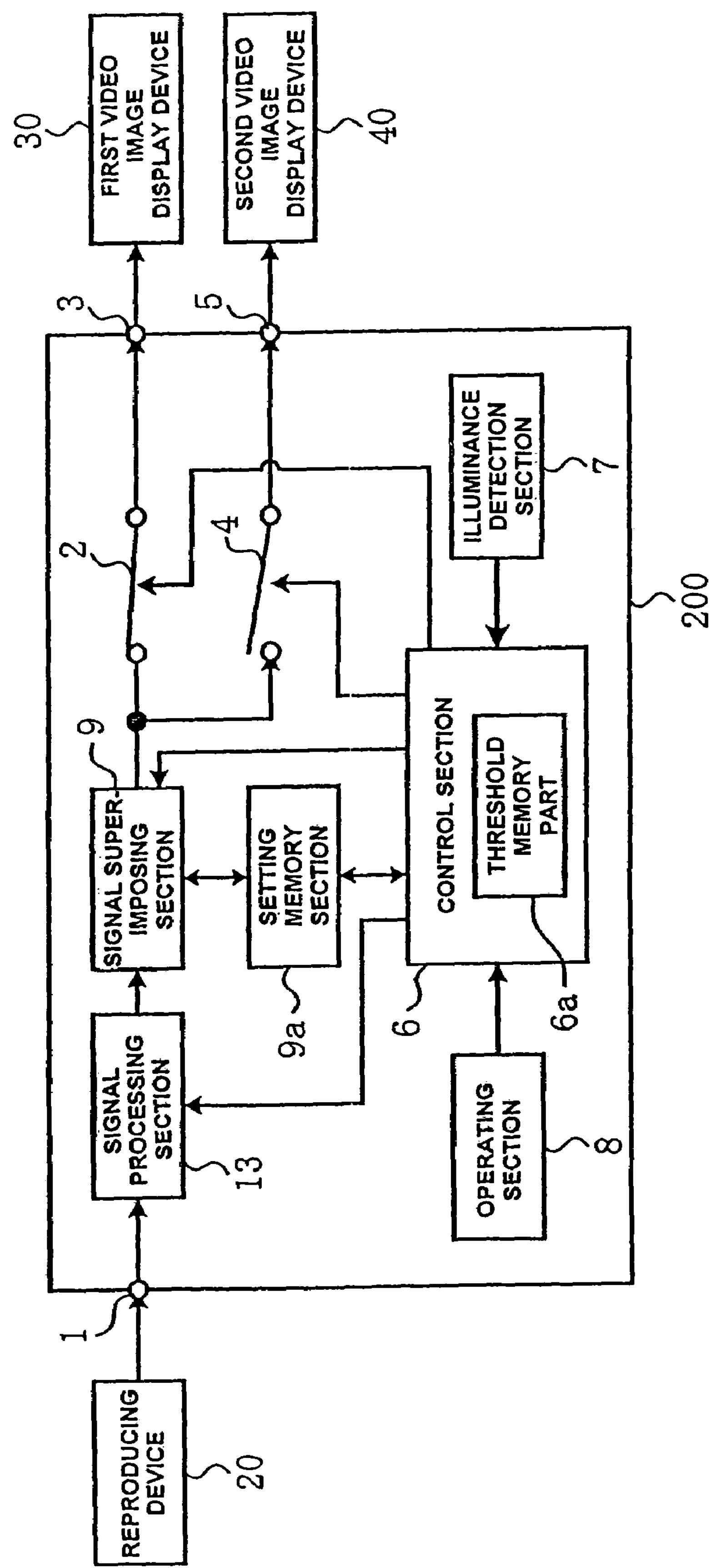
FIG. 7 shows another modification of the signal processing device according to the second embodiment of the present invention.

In this case, as shown in FIG. 7, the signal processing device 200 includes a signal superimposing section 9 and a setting memory section 9*a*. The signal superimposing section 9 superimposes video signals stored in the setting memory section 9*a* on the video signals inputted from the input terminal 1.

The setting memory section 9*a* stores video signals indicating adjustment items and adjustment values such as the image quality of the displayed images, etc. as well as setting items and setting values of the processing by the signal processing device 200. The values stored in the setting memory section 9*a* are either initial values inputted by the manufacturer or values set by the user.

The operating section 8 includes operating buttons, etc. (not shown) which are used by the user to perform the switching operation that determines whether or not the video signals indicating setting values, etc. are superimposed.

In the above construction, in the case that an input instructing the superimposition is received from the user via the operating section 8 (thus, the operating section 8 functions as an instruction input section in this case), the signal superimposing section 9 reads out the video signals that correspond to adjustment values or setting values relating to the image display from the setting memory section 9*a*, and superimposes these video signals on the inputted reproducing signals. As a result, the second video image display device 40 displays the display setting values, etc. also on the screen, so that the user can perform adjustments and/or settings while viewing these displayed values. The signal superimposing section 9 updates and stores the setting values in the setting memory section 9*a* in accordance with the values that are newly adjusted and/or set. As a result, the user can make adjustments and/or settings of the device more conveniently.

Figure 8:
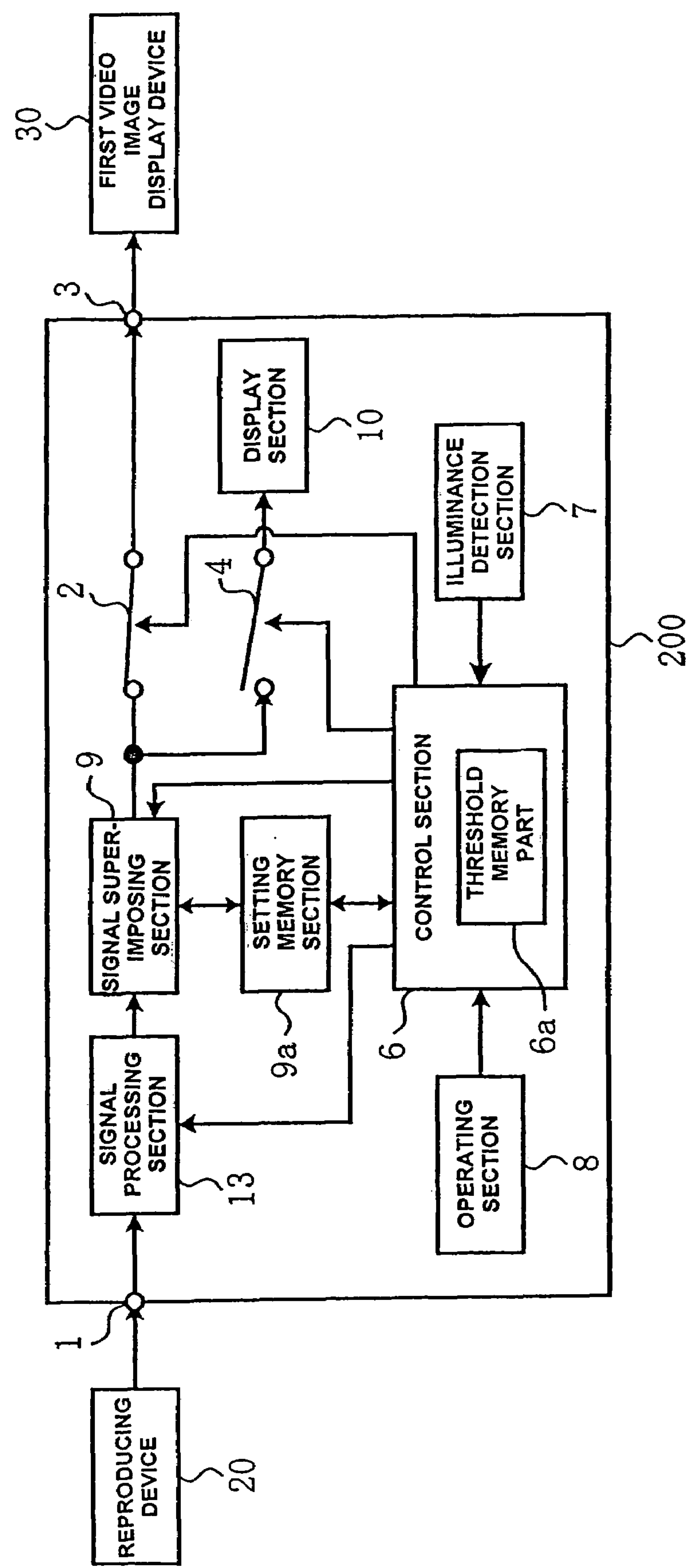
FIG. 8 shows still another modification of the signal processing device according to the second embodiment of the present invention.

Furthermore, as in the case of the signal processing device 200 shown in FIG. 6, it is, as shown in FIG. 8, also possible to output video signals to a display section 10 such as a liquid crystal display panel, etc. which is installed inside the signal processing device 200 instead of the second video image display device 40 provided outside the signal processing device 200.

Third Embodiment

Figure 9:
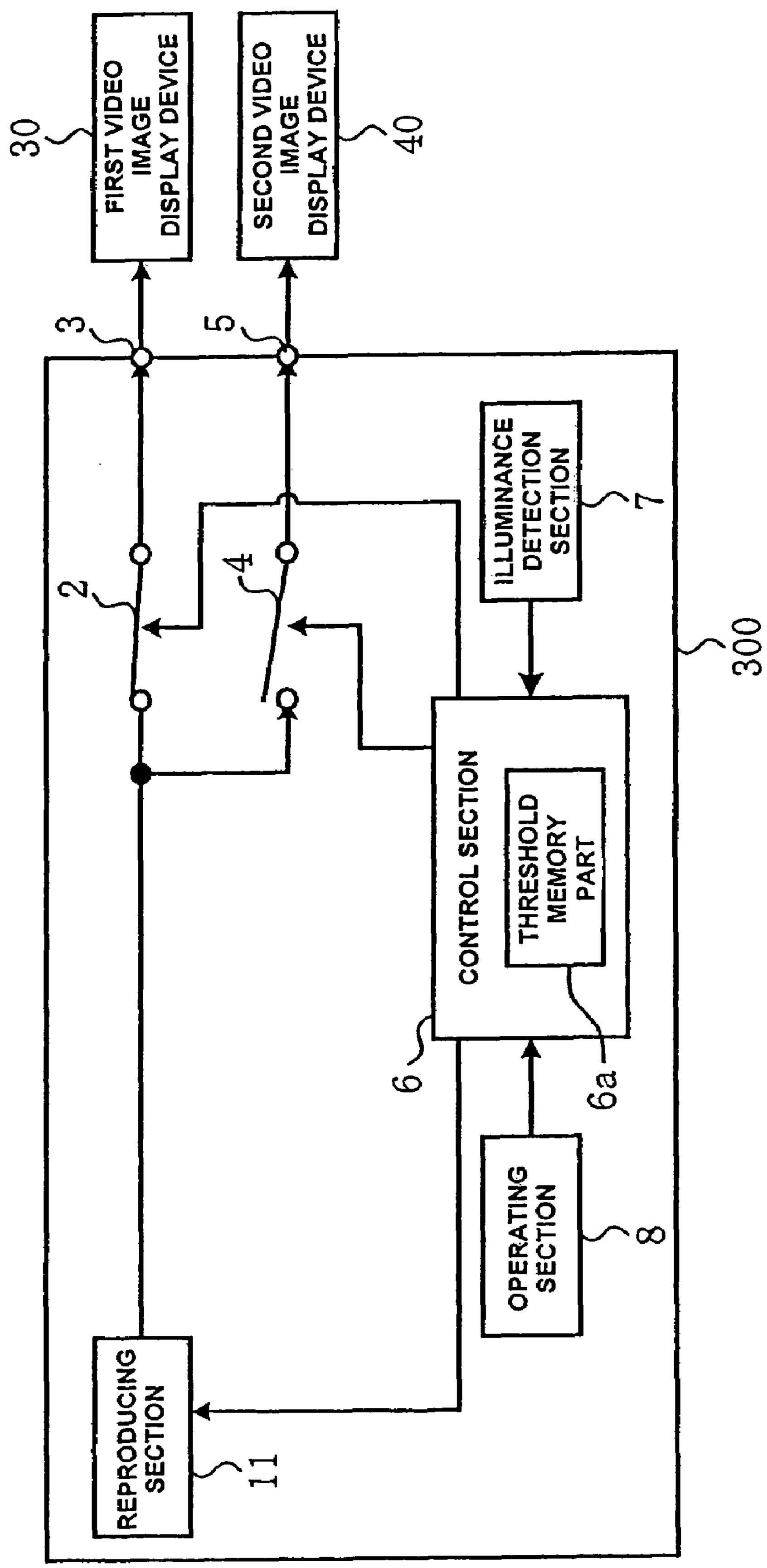
FIG. 9 is a block diagram of the reproducing device according to the third embodiment of the present invention.

FIG. 9 is a block diagram of the video signal reproducing (playback) device 300, a third embodiment of the present invention. In order to facilitate understanding, the elements that are the same as those shown in FIG. 1 and FIGS. 4 through 8 are labeled with the same reference symbols, and a description of such elements is omitted.

As shown in FIG. 9, the reproducing device 300 of the third embodiment has substantially the same construction as that of the above-described output selection device 100, and it further includes a reproducing (playback) section 11. The reproducing section 11 reproduces records that are recorded on a removable recording medium such as a DVD, etc. or on a fixed recording medium that is installed in the reproducing device 300.

The reproducing device 300 of the third embodiment has the same function as the output selection device 100 of the first embodiment. More specifically, at an illuminance less than a predetermined threshold, the reproducing device 300 outputs the processed video signals played back by the reproducing section 11 to only the first video image display device 30 with low brightness. At an illuminance equal to or greater than the threshold, the reproducing device 300 outputs the video signals to only the second video image display device 40 high brightness or to both the first and second video image display devices 30 and 40.

Accordingly, without switching between the display devices, the user can read the manuals under the necessary illuminance; and further, the user can perform adjustments and/or settings in a convenient manner via an easy-to-see screen that has a high brightness. If the room is darkened after the adjustments and/or settings, the system automatically changes to a display that uses the first video image display device 30 with low brightness. Thus, in this third embodiment, the reproducing device 300 is convenient for use.

Figure 10:
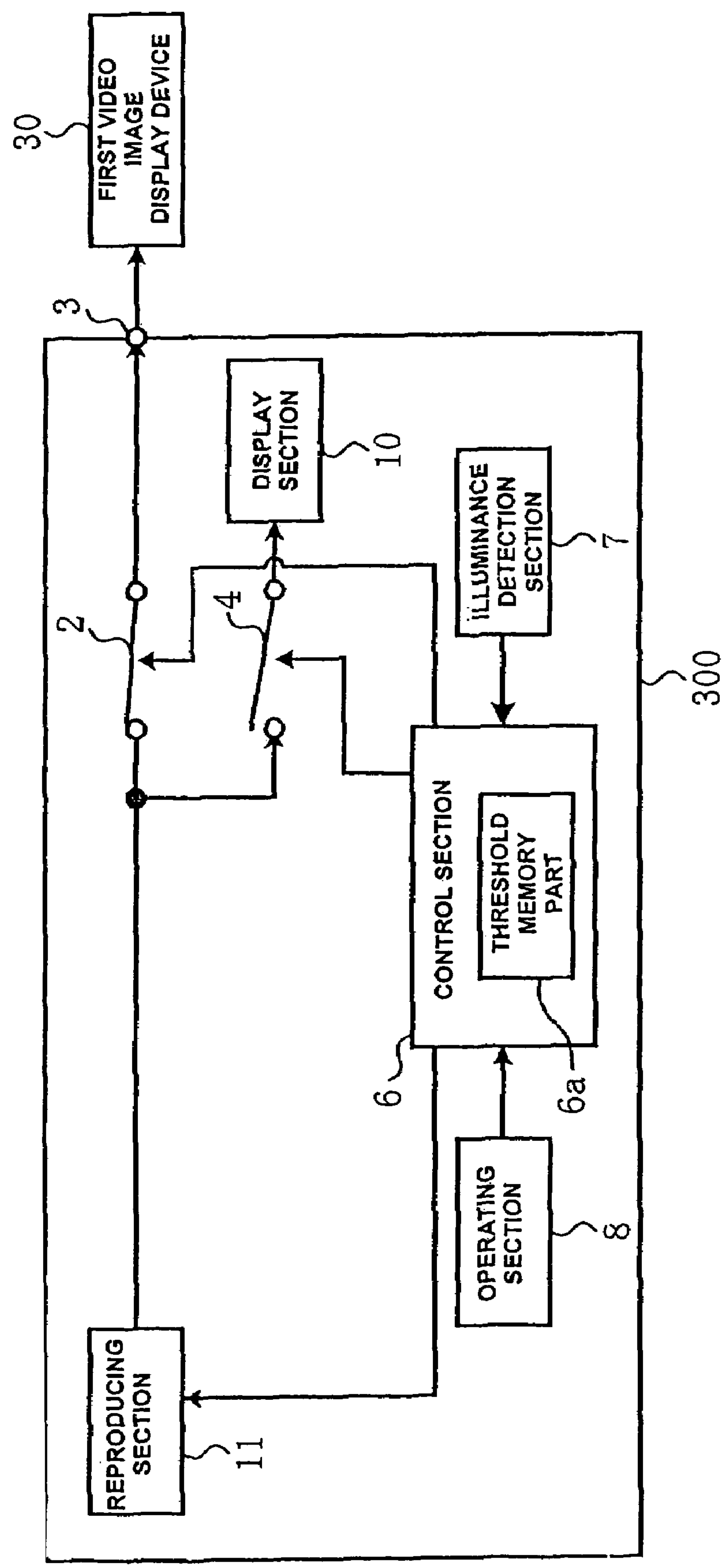
FIG. 10 shows a modification of the reproducing device of the third embodiment of the present invention.

In the reproducing device 300 of the third embodiment, as in the output selection device 100 shown in FIG. 4, it is, as shown in FIG. 10, possible to output video signals to a display section 10 such as a liquid crystal display panel, etc. which is installed inside the reproducing device 300 instead of the second video image display device 40 provided outside the reproducing device 300.

Figure 11:
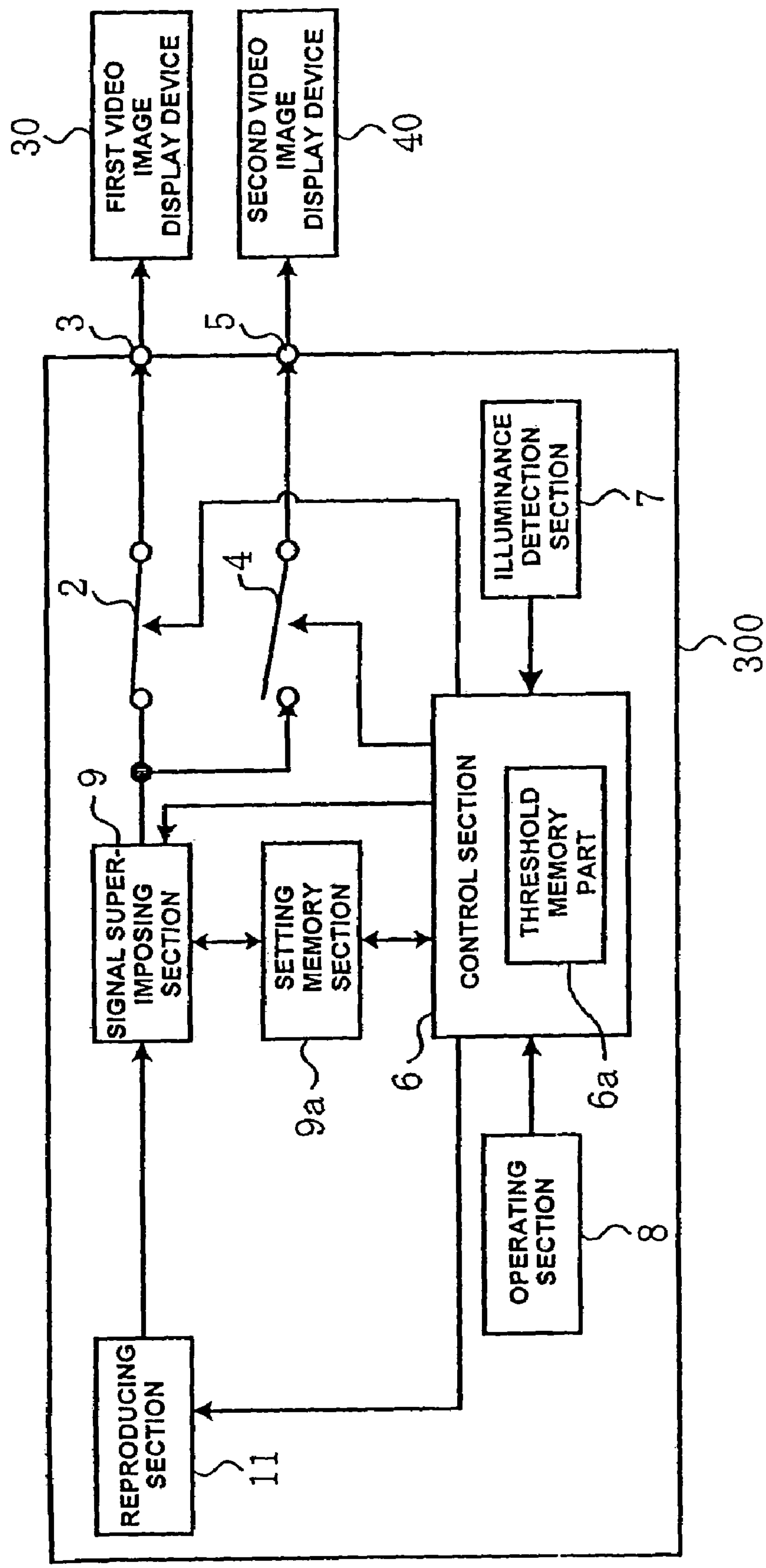
FIG. 11 shows another modification of the reproducing device of the third embodiment of the present invention.
Figure 12:
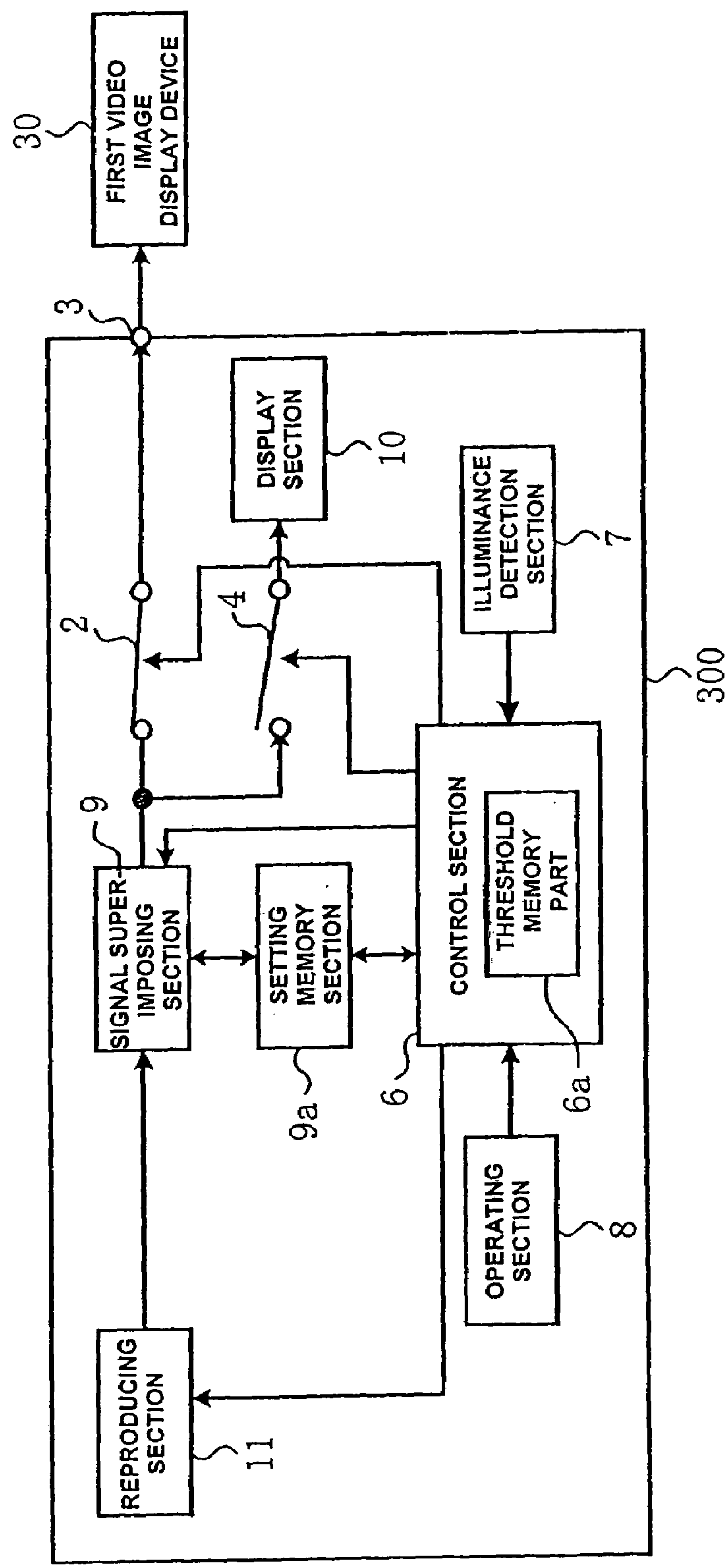
FIG. 12 shows still another modification of the reproducing device of the third embodiment of the present invention.

Furthermore, it is possible to design so that video signals that indicate adjustment items, adjustment values or setting values such as the image quality of the images that are displayed, etc. are outputted so that these signals are superimposed on the inputted reproducing signals as desired by the user. In this case, as in the case of the signal processing device 200 shown in FIG. 7, a signal superimposing section 9 and setting memory section 9*a* are additionally provided as shown in FIG. 11; and further, as shown in FIG. 12, it is also possible to display signals that are superimposed on an internally provided display section 10 instead of the second video image display device 40 provided outside the reproducing device 300.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The disclosure of Japanese Patent Application Nos. JP 2004-075582 filed on Mar. 17, 2004, and JP 2004-215071 filed on Jul. 23, 2004, including specification, claims, drawings and abstract is incorporated herein by reference in its entirety.

The invention claimed is:

1. A video signal output device comprising:

a first output section which outputs video signals to a first display device;

an illuminance detection section which detects ambient illuminance;

a determining section which determines whether or not the ambient illuminance detected by said illuminance detection section is equal to or greater than a predetermined value; and a second output section which, in a case that said determining section determines that the ambient illuminance is equal to or greater than the predetermined value, outputs the video signals to a second display device, said second display device providing a display with higher brightness than that for a display provided by said first display device.

2. The device according to claim 1, further comprising a reproducing section which reproduces video signals, wherein the video signals reproduced by said reproducing section are inputted to said first output section or/and said second output section.

3. The device according to claim 1, further comprising a signal processing section which executes given processing on the video signals, wherein the video signals processed by said signal processing section are inputted to said first output section or/and said second output section.

4. The device according to claim 3, further comprising a value input section which allows a user to input the predetermined value.

5. The device according to claim 3, wherein, in a case that said determining section determines that the ambient illuminance is equal to or greater than the predetermined value, said first output section refrains from outputting the video signals to said first display device.

6. The device according to claim 3, wherein, in a case that said determining section determines that the ambient illuminance is equal to or greater than the predetermined value, said first output section outputs the video signals to said first display.

7. The device according to claim 3, wherein said second display device is provided externally.

8. The device according to claim 3, wherein said second display device is provided internally.

9. The device according to claim 3, further comprising a signal superimposing section which superimposes a given video signal on the processed video signals.

10. The device according to claim 9, further comprising an instruction input section which allows a user to input an instruction to make said signal imposing section superimpose a given video signal on the video signals.

11. A method for outputting video signals, comprising:
- outputting video signals to a first display device;
- detecting ambient illuminance during the output of the video signals;
- determining whether or not detected illuminance is equal to or greater than a predetermined value; and
- outputting, in a case that it is determined that the ambient illuminance is equal to or greater than the predetermined value, the video signals to a second display device, said second display device providing a display with higher brightness than that for a display provided by said first display device.

12. The method according to claim 11, further comprising reproducing video signals, wherein the video signals reproduced by said reproducing are inputted to said first display device or/and said second display device.

13. The method according to claim 11, further comprising executing given processing on the video signals, wherein the video signals processed by said executing are inputted to said first display device or/and said second display device.

14. The method according to claim 13, wherein the predetermined value is inputted by a user.

15. The method according to claim 13, wherein the inputted video signals are, in a case that it is determined that the ambient illuminance is equal to or greater than the predetermined value, refrained from being outputted to said second display device.

16. The method according to claim 13, wherein the inputted video signals are, in a case that it is determined that the ambient illuminance is equal to or greater than the predetermined value, outputted to said second display device.

17. The method according to claim 13, wherein a given video signal is further superimposed on the processed video signals.

18. The method according to claim 17, wherein an instruction to superimpose a specified video signal on the processed video signals is inputted by a user.

* * * * *